US006430499B1

(12) United States Patent
Nakano et al.

(10) Patent No.: US 6,430,499 B1
(45) Date of Patent: Aug. 6, 2002

(54) INFORMATION TERMINAL AND CARTOGRAPHIC INFORMATION PROVIDING SYSTEM

(75) Inventors: Nobuyuki Nakano, Toyonaka; Ryotaro Iwami, Kobe; Tsuyoshi Kindo, Sennan-gun, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/094,626

(22) Filed: Mar. 12, 2002

(30) Foreign Application Priority Data

Mar. 13, 2001 (JP) ........................................ 2001-069951

(51) Int. Cl.[7] ................................................ G01C 2/30
(52) U.S. Cl. ........................ 701/208; 701/213; 701/209
(58) Field of Search ................................ 701/208, 207, 701/209, 210, 211, 212, 213, 23, 24, 25; 342/357; 340/995, 990, 450, 451, 457

(56) References Cited

U.S. PATENT DOCUMENTS 6,334,087 B1 * 12/2001 Nakano et al. ............. 701/208
6,366,852 B2 * 4/2002 Irie et al. .................... 701/207
6,381,536 B1 * 4/2002 Satoh et al. ................. 701/209
6,385,534 B1 * 5/2002 Yoshimara et al. ......... 701/208

FOREIGN PATENT DOCUMENTS

| JP | 7-154350 | 6/1995 |
| JP | 7-262463 | 10/1995 |

* cited by examiner

*Primary Examiner*—Richard M. Camby
(74) *Attorney, Agent, or Firm*—Wenderoth, Lind & Ponack, L.L.P.

(57) ABSTRACT

An information terminal 1 is provided with a first input section 11, a position detector 12, a first arithmetic operation section 13, a data storage section 15, a first data reader 18, a connection information generator 17, and a first output section 16. The data storage section 15 stores cartographic data having the data structure simplified but capable of recovering information about connection among nodes and links constructing a road network. The connection information generator 17 complements the connection information of the cartographic data. The first arithmetic operation section 13 uses the connection information complemented by the connection information generator 17 to carry out data processing for various purposes, such as route search and position detection.

18 Claims, 11 Drawing Sheets

UNIT

UNIT DATA

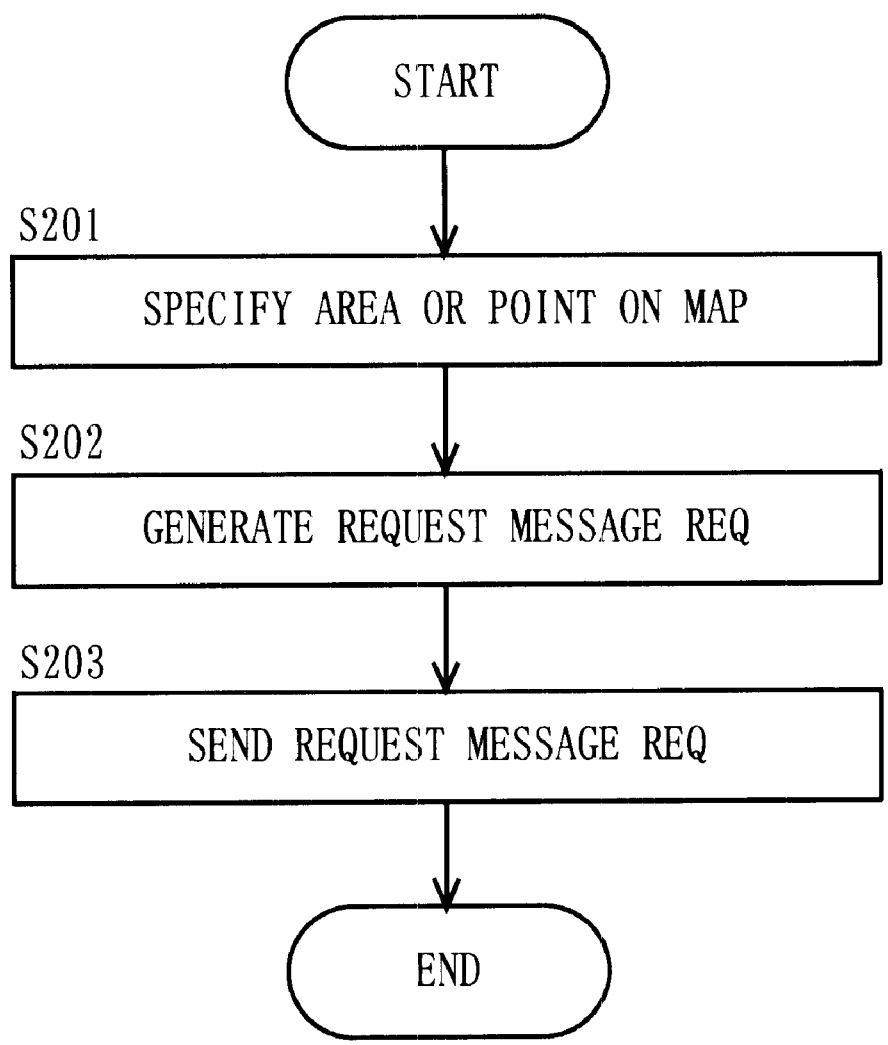

FIG. 9A

| CARTOGRAPHIC DATA REQUEST COMMAND |
|---|
| LOWER-LEFT LONGITUDE COORDINATE |
| LOWER-LEFT LATITUDE COORDINATE |
| UPPER-RIGHT LONGITUDE COORDINATE |
| UPPER-RIGHT LATITUDE COORDINATE |

FIG. 9B

| CARTOGRAPHIC DATA REQUEST COMMAND |
|---|
| LONGITUDE COORDINATE OF POINT |
| LATITUDE COORDINATE OF POINT |

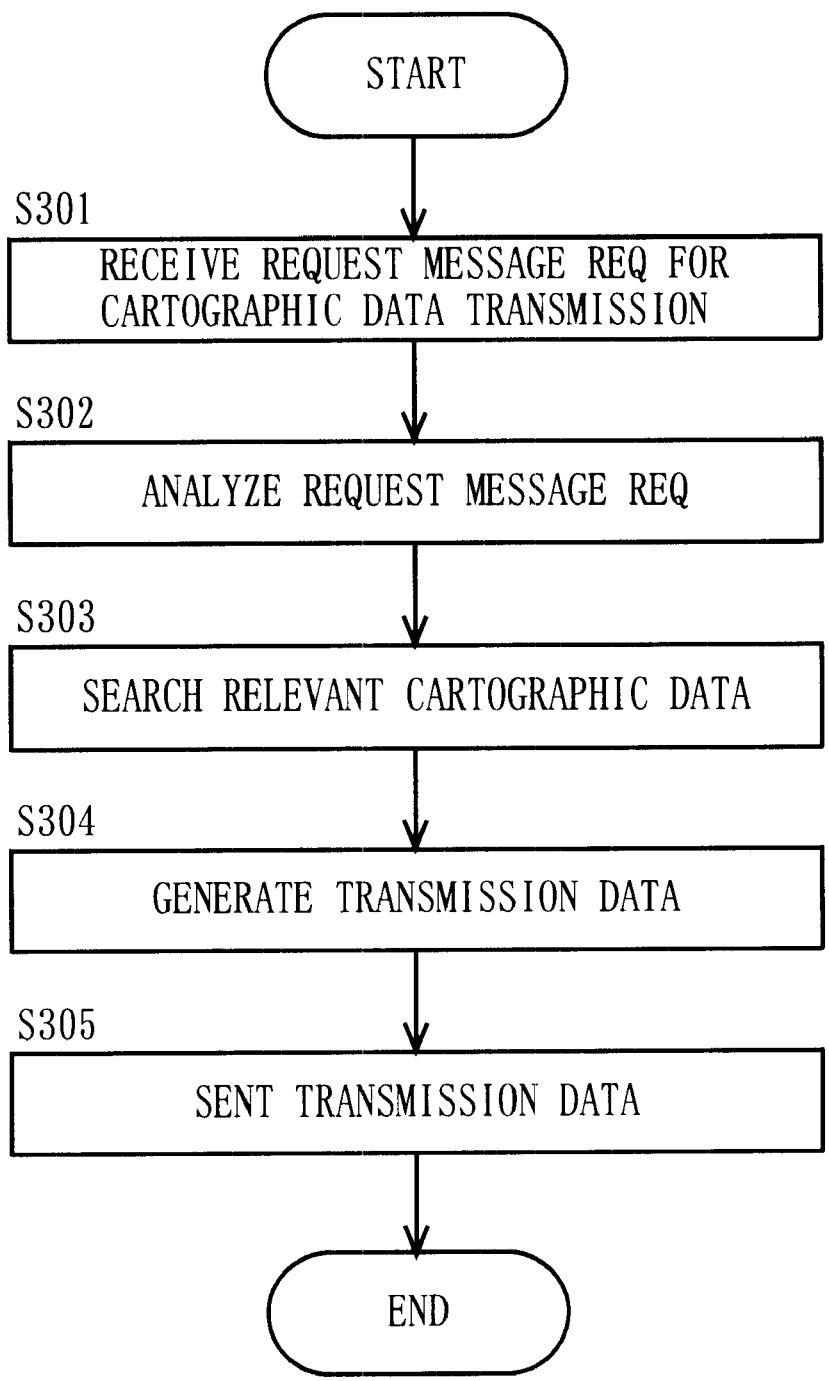

F I G. 1 1
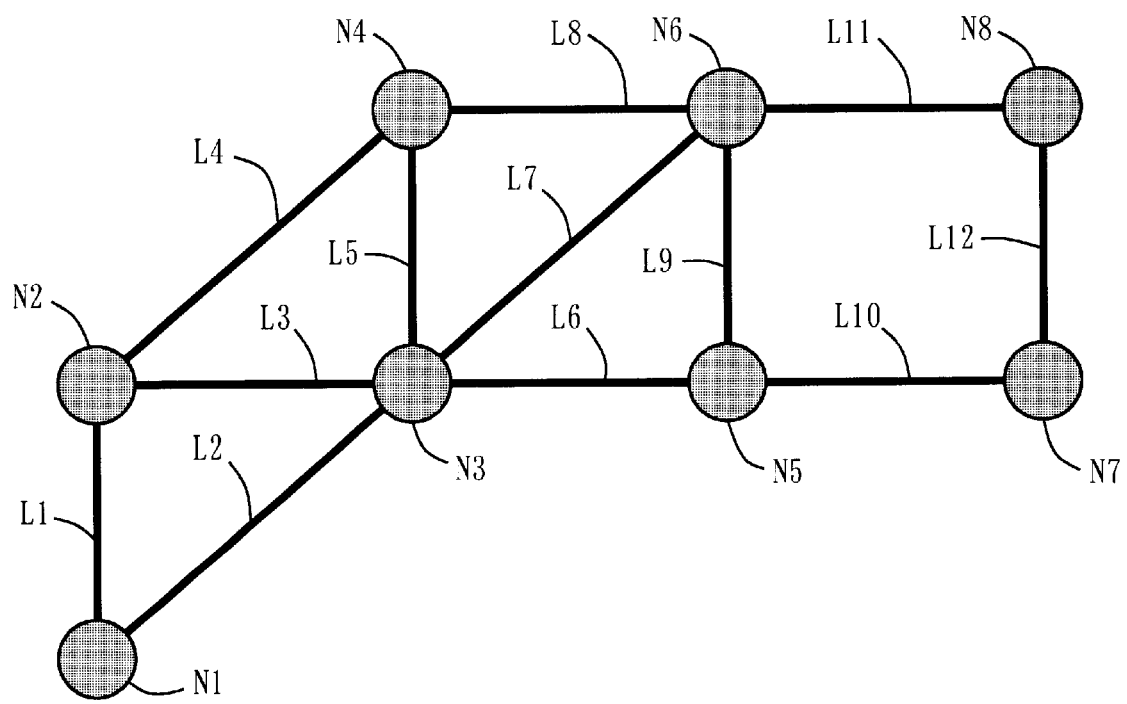

INFORMATION TERMINAL AND CARTOGRAPHIC INFORMATION PROVIDING SYSTEM

BACKGROUND OF THE INVENTION

1. Field of the Invention

The present invention relates to information terminals and cartographic information providing systems and, more specifically, an information terminal and a cartographic information providing system for carrying out map display, position detection, route search, and route guidance by using digital cartographic data.

2. Description of the Background Art (First Conventional Art)

In recent years, vehicles with a navigation system mounted thereon have been prevalent. Such conventional navigation system includes a map storage device having a read-only large-capacity storage medium, such as CD-ROM and DVD-ROM. A terminal for achieving this navigation system is implemented by a terminal dedicated to the navigation system, a general-purpose information processing device such as a PDA (Personal Digital Assistant), or other devices. The storage medium previously stores cartographic data for presentation to users. The storage device reads the cartographic data stored in the storage medium as required. The read digital cartographic data is used for route search or correction of a current position (map matching). To carry out these processes, the cartographic data contains road network data including at least connection information indicating how nodes and links are connected to one another. Here, each node indicates an intersection located on a road network, and each link indicates a vector representing a road located between two intersections (nodes). The nodes and the links are connected to one another, and information about how they are connected is included in the road network data. Based on the road network data including a collection of the nodes, the links, and the connection information, the road network is presented on a map.

The nodes, the links, and the connection information are enough for representing a minimum required road network, but not enough for displaying a map. For example, roads on mountain or seashore ranges are often curved between intersections. To display the curved shapes of the roads, the road network data further includes information for specifying the shapes of the links.

Furthermore, to classify the roads by types, such as national highways, local roads, the number of lines, and the presence or absence of central reserves, the road network data further includes attribute information indicating the types of roads, etc.

Some intersections are provided with names, and some are not. Furthermore, some intersections have a traffic signal and some do not. Therefore, the road network data further includes attribution information for each node. The attribution information for each node contains a name of the intersection corresponding to the relevant node, the presence or absence of a traffic signal, etc.

(Second Conventional Art)

As described in the above first conventional art, the conventional navigation system can use only the cartographic data recorded on the read-only storage medium, and therefore can hardly provide real-time information. Such real-time information is typified by, for example, traffic information and weather information. Japanese Patent Laid-Open Publication No. 7-262493 (1995-262493) discloses a map providing system capable of providing real-time information and cartographic data. In this map providing system, real-time information and cartographic data are downloaded from an information providing center (center station) through a communications medium to a vehicle-mounted terminal. Furthermore, to achieve the above navigation system, a terminal having a small data storage capacity, such as a general-purpose information processing device (PDA, cell phone terminal, etc.), may be used for downloading the cartographic data from the center station.

The above map providing system is constructed based on mobile terminal communications technologies and digital broadcast technologies for providing various information on a real-time basis. In the above constructed map providing system, the center station distributes information to the mobile terminal located within a service area by using a predetermined broadcast channel. The center station is typified by a communications satellite (CS), a broadcast satellite (BS), or a ground-wave digital broadcast station. An example map providing system using these mobile terminal communications technologies and digital broadcast technologies is disclosed in Japanese Patent Laid-Open Publication No. 7-154350 (1995-154350), wherein a technique for limiting a broadcast area capable of receiving specific information is disclosed.

In the map providing system disclosed in Japanese Patent Laid-Open Publication No. 7-154350, a center station adds an area code, such as a postal code, to specific multiplexed information when transmitting it through a broadcast medium. A receiving terminal, on the other hand, registers in advance the area code corresponding to an area that covers its current position in memory as the ID. In the terminal, a data extracting circuit separates multiplex information distributed from the center station to extract the area code added to the information. The terminal then compares the extracted area code with the ID registered in advance in the memory. If they match, the terminal enables the user to refer to the information with the area code added thereto.

As such, map providing systems for providing a terminal with cartographic data through telecommunications or broadcasting have been increasingly developed in recent years. In such map providing systems, the center station transmits cartographic data to the terminal, and the terminal receives the cartographic data and then stores it in a storage device. The stored cartographic data is used as required by users for carrying out viewing, route search, map matching, or other processing.

As described in the above first conventional art, the road network is conventionally represented by nodes and links, and the connection information among the nodes and the links is recorded in advance in the cartographic data. This is to quickly and efficiently read the connection information of the road network data in the cartographic data. However, the connection information among the nodes and the links recorded in the cartographic data is so detailed that the cartographic data becomes extremely large in amount.

Here, processing such as route search and map matching by using the cartographic data is briefly described. FIG. 11 is a schematic illustration showing example nodes and links represented by the cartographic data.

In FIG. 11, a road network represented in the cartographic data is composed of eight nodes N1 to N8 and twelve links L1 to L12. To carry out route search and map matching by using the road network, how the nodes and the links are connected has to be traced. For example, when the shortest route starting from the node N1 to the node N8 is traced as the node N1->the link L2->the node N3->the link L6->, the node N5->the link L9->the node N6->the link L11->the node N8, the route has to be traced as in the following processes.

Process 1: The node N1 has two links connected thereto, one of which is the link L2.
Process 2: The link L2 is connected to the node N3.
Process 3: The node N3 has five links connected thereto, one of which is the link L6.
Process 4: The link L6 is connected to the node N5.
Process 5: The node N5 has three links connected thereto, one of which is the link L9.
Process 6: The link L9 is connected to the node N6.
Process 7: The node N6 has four links connected thereto, one of which is the link L11.
Process 8: The link L11 is connected to the node N8.

In other words, the connection information has to include node-to-link information indicating which link is connected to each node (Processes 1, 3, 5, and 7), and link-to-node information indicating which node is connected to each link (Processes 2, 4, 6, and 8).

Described next is road network data for tracing the route by using such connection information among the nodes and the links. FIG. 12 is an example structure of the road network data that represents the road network.

In FIG. 12, the road network data is structured by a node table that contains eight node records respectively corresponding the eight node N1 to N8, and a link table that contains twelve link records respectively corresponding the twelve links L1 to L12. Each node record in the node table stores data representing information about an attribute and coordinates of that node. Each node record also stores the number of links connected to that node, and link pointer information about a pointer indicating a storage location in the link table of each link record corresponding to the link connected to the node (the number of links and the link pointer information correspond to the node-to-link connection information described above).

On the other hand, each link record stores data representing information about an attribute of that link. Each link record also stores the number of nodes connected to the link, and node pointer information about a pointer indicating a storage location in the node table of each node record corresponding to the node connected to the link (the number of nodes and the node pointer information correspond to the link-to-node connection information described above).

With such data structure, it is possible to easily find which link is connected to an arbitrary node and further which node is connected to an arbitrary link, and therefore easily trace a route on the road network. In this data structure, however, each node record in the node table has to contain the link pointer information as many as the number of links connected to the node. Similarly, each link record in the link table has to contain the node pointer information for two nodes connected to the link. Consequently, information required for representing the road network data becomes enormous. The larger the area to be displayed based on the road network data (when the entire Japan is displayed, for example), the more the required data becomes increased in amount. Moreover, when a general-purpose information processing device having a small data storage capacity (a PDA, a cell phone terminal, etc.) is used, further reduction in the amount of the cartographic data is required.

Also in the map providing system described in the second conventional art, the cartographic data distributed from the center station to the terminal has the data structure as described above. Therefore, the cartographic data transmitted from the center station to the terminal becomes increased in amount, thereby increasing time and cost required for data transfer.

SUMMARY OF THE INVENTION

Therefore, an object of the present invention is to provide an information terminal and a cartographic information providing system capable of reducing the amount of digital cartographic data without impairing a function of an application using the cartographic data.

The present invention has the following features to attain the object above.

A first aspect of the present invention is directed to an information terminal for processing cartographic data including node data representing intersections on roads as nodes and link data representing the roads as links, and the terminal includes: a cartographic data storage section for storing the cartographic data; and a cartographic data processing section for processing the cartographic data stored in the cartographic data storage section. The cartographic data stored in the cartographic data storage section only has one-side connection information described therein, the one-side connection information indicating a connecting relation viewed in a direction from one of the nodes and the links to another one. The cartographic data processing section includes: a cartographic data reader for reading a required portion of the cartographic data from the cartographic data storage section; a complementing section for complementing the read cartographic data by generating another-side connection information based on the one-side connection information described in the cartographic data read by the cartographic data reader, the other-side connection information indicating a connecting relation viewed in a direction reverse to the direction taken in the one-side connection information; and a cartographic data arithmetic operation section for carrying out an arithmetic operation on the cartographic data complemented with the other-side connection in formation.

According to the above structure, the cartographic data stored in the cartographic data storage section has the one-side connection information indicating a connecting relation among nodes and links constructing the road network required for carrying out position detection, route search, etc., and the connecting relation is the one viewed either from the nodes to the links or from the links to the nodes. Therefore, it is possible to reduce the amount of cartographic data. As a result, the cartographic data storage section can store data covering a larger area or save its storage space. Also, based on the one-side connection information, the cartographic data processing section complements the cartographic data to be processed by newly generating the other-side connection information indicating a connecting relation viewed in a direction reverse to the direction taken in the one-side connection information. Therefore, it is possible to trace the connecting relation of the road network without impairing efficiency of processes such as position detection and route search using the cartographic data.

The cartographic data stored in the cartographic data storage section includes, in one example, node connection information indicating a connecting relation viewed from the links to the nodes as the one-side connect ion information. The complementing section complements the read cartographic data by generating, based on the node connection information included in the cartographic data read by the cartographic data reader, link connection information indicating a connecting relation viewed from the nodes to the links as the other-side connection information. In this case, of the information about connection among the nodes and links constructing the road network required for position detection, route search, etc., the cartographic data is so structured as to store only information about connection from the links to the nodes. In general, the information about connection from the nodes to the links is larger in amount than the information about connection from the links to the nodes. Therefore, the above structure is quite effective to reduce the amount of cartographic data. As a result, the cartographic data storage section can store data covering a larger area or save its storage space. Also, the cartographic data to be processed is complemented with a newly generated information about connection from the nodes to the links, the information that has been omitted. Therefore, it is possible to trace the connecting relation of the road network without impairing efficiency of processes such as position detection and route search using the cartographic data.

Also, the cartographic data stored in the cartographic data storage section includes, in another example, link connection information indicating a connecting relation viewed from the nodes to the links as the one-side connection information, and the complementing section complements the read cartographic data by generating, based on the link connection information included in the cartographic data read by the cartographic data reader, node connection information indicating a connecting relation viewed from the links to the nodes as the other-side connection information. In this case, of the information about connection among the nodes and links constructing the road network required for position detection, route search, etc., the cartographic data is so structured as to store only information about connection from the nodes to the links. Therefore, it is possible to reduce the amount of cartographic data. As a result, the cartographic data storage section can store data covering a larger area or save its storage space. Also, the cartographic data to be processed is complemented with a newly generated information about connection from the links to the nodes, the information that has been omitted. Therefore, it is possible to trace the connecting relation of the road network without impairing efficiency of processes such as position detection and route search using the cartographic data.

A second aspect of the present invention is directed to a cartographic information providing system in which an information terminal for processing cartographic data including node data representing intersections on roads as nodes and link data representing the roads as links is provided with the cartographic data from a center station via a transmission path. The center station includes: a first cartographic data storage section for storing the cartographic data; and a cartographic data transmitter for reading the cartographic data requested by the information terminal from the first cartographic data storage section and transmitting the read cartographic data to the information terminal via the transmission path. The information terminal includes: a cartographic data receiver for receiving the cartographic data transmitted from the center station via the transmission path; a second cartographic data storage section for storing the cartographic data received by the cartographic data receiver; and a cartographic data processing section for processing the cartographic data stored in the second cartographic data storage section. The cartographic data transmitted from the center station only has one-side connection information described therein, the one-side connection information indicating a connecting relation viewed in a direction from one of the nodes and the links to another one. The cartographic data processing section includes: a cartographic data reader for reading a required portion of the cartographic data from the cartographic data storage section; a complementing section for complementing the read cartographic data by generating another-side connection information based on the one-side connection information described in the cartographic data read by the cartographic data reader, the other-side connection information indicating a connecting relation viewed in a direction reverse to the direction taken in the one-side connection information; and a cartographic data arithmetic operation section for carrying out an arithmetic operation on the cartographic data complemented with the other-side connection information.

In the above structure, the cartographic data stored in the first cartographic data storage section includes information required for position detection, route search, etc., about a connecting relation among the nodes and links constructing the road network, but only includes the one-side connection information indicating a connecting relation viewed either from the links to the nodes or from the nodes to links as the oneside connection information. Therefore, it is possible to reduce the amount of cartographic data. As a result, the first cartographic data storage section can store data covering a larger area or save its storage space. Also, when the cartographic data stored in the first cartographic data storage section is transmitted from the center station to the information terminal via the transmission path, the data amount to be transmitted is small, thereby reducing time required for transmission. Furthermore, when the cartographic data transmitted via the transmission path is received by the information terminal for storage in the second cartographic data storage section, the data amount received is small, thereby enabling the second cartographic data storage section to store data covering a larger area or saving storage space of the second cartographic data storage section. Still further, the cartographic data processing section complements the cartographic data by generating, based on the one-side connection information, the other-side connection information indicating a connecting relation viewed in a direction reverse to the direction taken in the one-side connection information. Therefore, it is possible to trace the connecting relation of the road network without impairing efficiency of processes such as position detection and route search using the cartographic data.

The cartographic data transmitted from the center station includes, in one example, node connection information indicating a connecting relation viewed from the links to the nodes as the one-side connection information. The complementing section complements the read cartographic data by generating, based on the node connection information included in the cartographic data read by the cartographic data reader, link connection information indicating a connecting relation viewed from the nodes to the links as the other-side connection information. In this case, of the information about connection among the nodes and links constructing the road network required for position detection, route search, etc., the cartographic data stored in the first cartographic data storage section is so structured as to store only information about connection from the links to the nodes. In general, the information about connection from the nodes to the links is larger in amount than the information about connection from the links to the nodes. Therefore, the above structure is quite effective to reduce the amount of cartographic data. As a result, the first cartographic data storage section can store data covering a larger area or save its storage space. Also, when the cartographic data stored in the first cartographic data storage section is transmitted from the center station to the information terminal via the transmission path, the data to be transmitted is small, thereby reducing time required for transmission. Furthermore, when the cartographic data transmitted via the communication path is received by the information terminal for storage in the second cartographic data storage section, the received data amount is small, thereby enabling the second cartographic data storage section to store data covering a larger area or saving space in the second cartographic data storage section. Still further, the cartographic data to be processed is complemented with a newly generated information about connection from the nodes to the links, the information that has been omitted. Therefore, it is possible to trace the connecting relation of the road network without impairing efficiency of processes such as position detection and route search using the cartographic data.

Also, the cartographic data transmitted from the center station section includes, in another example, link connection information indicating a connecting relation viewed from the nodes to the links as the one-side connection information, and the complementing section complements the read cartographic data by generating, based on the link connection information included in the cartographic data read by the cartographic data reader, node connection information indicating a connecting relation viewed from the links to the nodes as the other-side connection information. In this case, of the information about connection among the nodes and links constructing the road network required for position detection, route search, etc., the cartographic data stored in the first cartographic data storage section is so structured as to store only information about connection from the nodes to the links. Therefore, it is possible to reduce the amount of cartographic data. As a result, the first cartographic data storage section can store data covering a larger area or save its storage space. Also, when the cartographic data stored in the first cartographic data storage section is transmitted from the center station to the information terminal via the transmission path, the data to be transmitted is small, thereby reducing time required for transmission. Furthermore, when the cartographic data transmitted via the communication path is received by the information terminal for storage in the second cartographic data storage section, the received data amount is small, thereby enabling the second cartographic data storage section to store data covering a larger area or saving space in the second cartographic data storage section. Still further, the cartographic data to be processed is complemented with a newly generated information about connection from the links to the nodes, the information that has been omitted. Therefore, it is possible to trace the connecting relation of the road network without impairing efficiency of processes such as position detection and route search using the cartographic data.

A third aspect of the present invention is directed to a computer program embodied on a computer readable medium for processing cartographic data including node data representing intersections on roads as nodes and link data representing the roads as links. The program includes: a step storing the cartographic data; and a step of processing the cartographic data stored in the storing step. The cartographic data stored in the storing step only has one-side connection information described therein, the one-side connection information indicating a connecting relation viewed in a direction from one of the nodes and the links to another one. The cartographic data processing step includes: a step of reading a required portion of the cartographic data stored in the storing step; a step of complementing the read cartographic data by generating another-side connection information based on the one-side connection information described in the cartographic data read by the reading step, the other-side connection information indicating a connect- ing relation viewed in a direction reverse to the direction taken in the one-side connection information; and a step of carrying out an arithmetic operation on the cartographic data complemented with the other-side connection information The cartographic data stored in the storing step includes, in one example, node connection information indicating a connecting relation viewed from the links to the nodes as the one-side connection information. In the complementing step, the read cartographic data is complemented with link connection information indicating a connecting relation viewed from the nodes to the links as the other-side connection information, the link connection information generated based on the node connection information included in the cartographic data read in the reading step. Also, the cartographic data stored in the storing step includes link connection information indicating a connecting relation viewed from the nodes to the links as the one-side connection information. In the complementing step, the read cartographic data is complemented with node connection information indicating a connecting relation viewed from the links to the nodes as the other-side connection information, the node connection information generated based on the link connection information included in the cartographic data read in the reading step.

A fourth aspect of the present invention is directed to a computer program embodied on a computer readable medium for processing cartographic data including node data representing intersections on roads as nodes and link data representing the roads as links, the cartographic data being provided by a center station via a transmission path. The program includes: a step of receiving the cartographic data from the center station via the transmission path; a step of storing the cartographic data received in the receiving step; and a step of processing the cartographic data stored in the storing step. The cartographic data stored in the storing step only has one-side connection information described therein, the one-side connection information indicating a connecting relation viewed in a direction from one of the nodes and the links to another one. The cartographic data processing step includes: a step of reading a required portion of the cartographic data stored in the storing step; a step of complementing the read cartographic data by generating another-side connection information based on the one-side connection information described in the cartographic data read by the reading step, the other-side connection information indicating a connecting relation viewed in a direction reverse to the direction taken in the one-side connection information; and a step of carrying out an arithmetic operation on the cartographic data complemented with the other-side connection information.

The cartographic data transmitted from the center station includes, in one example node connection information indicating a connecting relation viewed from the links to the nodes as the one-side connection information. In the complementing step, the read cartographic data is complemented with link connection information indicating a connecting relation viewed from the nodes to the links as the other-side connection information, the link connection information generated based on the node connection information included in the cartographic data read in the reading step. Also, the cartographic data transmitted from the center station includes, in another example, link connection information indicating a connecting relation viewed from the nodes to the links as the one-side connection information. In the complementing step, the read cartographic data is complemented with node connection information indicating a connecting relation viewed from the links to the nodes as the other-side connection information, the node information generated based on the link connection information included in the cartographic data read in the reading step.

A fifth aspect of the present invention is directed to an information processing method for processing cartographic data including node data representing intersections on roads as nodes and link data representing the roads as links. The method includes: a step of storing the cartographic data; and a step of processing the cartographic data stored in the storing step. The cartographic data stored in the storing step only has one-side connection information described therein, the one-side connection information indicating a connecting relation viewed in a direction from one of the nodes and the links to another one. The cartographic data processing step includes: a step of reading a required portion of the cartographic data stored in the storing step; a step of complementing the read cartographic data by generating another-side connection information based on the one-side connection information described in the cartographic data read by the reading step, the other-side connection information indicating a connecting relation viewed in a direction reverse to the direction taken in the one-side connection information; and a step of carrying out an arithmetic operation on the cartographic data complemented with the other-side connection information.

The cartographic data stored in the storing step includes, in one example, node connection information indicating a connecting relation viewed from the links to the nodes as the one-side connection information. In the complementing step, the read cartographic data is complemented with link connection information indicating a connecting relation viewed from the nodes to the links as the other-side connection information, the link connection information generated based on the node connection information included in the cartographic data read in the reading step. The cartographic data stored in the storing step includes, in another example, link connection information indicating a connecting relation viewed from the nodes to the links as the one-side connection information. In the complementing step, the read cartographic data is complemented with node connection information indicating a connecting relation viewed from the links to the nodes as the other-side connection information, the node connection information generated based on the link connection information included in the cartographic data read in the reading step.

A sixth aspect of the present invention id directed to a cartographic information providing method for providing an information terminal with cartographic data including node data representing intersections on roads as nodes and link data representing the roads as links, the cartographic data being provided by a center station via a transmission path. The method includes, at the center station, the method comprising, at the center station, a first storing step of storing the cartographic data; and a step of reading a portion of the cartographic data requested by the information terminal from the cartographic data stored in the first storing step, and transmitting the read cartographic data to the information terminal via the transmission path; and at the information terminal device, a step of receiving the cartographic data transmitted from the center station via the transmission path; a second storing step of storing the cartographic data received in the receiving step; and a step for processing the cartographic data stored in the second storing step. The cartographic data transmitted from the center station only having one-side connection information described therein, the one-side connection information indicating a connecting relation viewed in a direction from one of the nodes and the links to another one. The cartographic data processing step includes: a step of reading a required portion of the cartographic data stored in the second storing step; a step of complementing the read cartographic data by generating another-side connection information based on the one-side connection information described in the cartographic data read by the reading step, the other-side connection information indicating a connecting relation viewed in a direction reverse to the direction taken in the one-side connection information; and a step of carrying out an arithmetic operation on the cartographic data complemented with the other-side connection information.

The cartographic data transmitted from the center station includes, in one example, node connection information indicating a connecting relation viewed from the links to the nodes as the one-side connection information. In the complementing step, the read cartographic data is complemented with link connection information indicating a connecting relation viewed from the nodes to the links as the other-side connection information, the link connection information generated based on the node connection information included in the cartographic data read in the reading step. The cartographic data transmitted from the center station includes, in another example, link connection information indicating a connecting relation viewed from the nodes to the links as the one-side connection information. In the complementing step, the read cartographic data is complemented with node connection information indicating a connecting relation viewed from the links to the nodes as the other-side connection information, the node information generated based on the link connection information included in the cartographic data read in the reading step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart showing the procedure carried out by an information terminal 1 of FIG. 7 for requesting a center station 2 to transmit cartographic data representing a required area;

FIGS. 9A and 9B are illustrations each showing an example data format of a request message REQ transmitted from the information terminal 1 of FIG. 7;

FIG. 10 is a flowchart showing the procedure carried out by the center station 2 of FIG. 7 for transmitting cartographic data;

FIG. 11 is an illustration showing an example road network represented by cartographic data.

DESCRIPTION OF THE PREFERRED EMBODIMENTS (First Embodiment)

"Structure of the Device"

Figure 1:
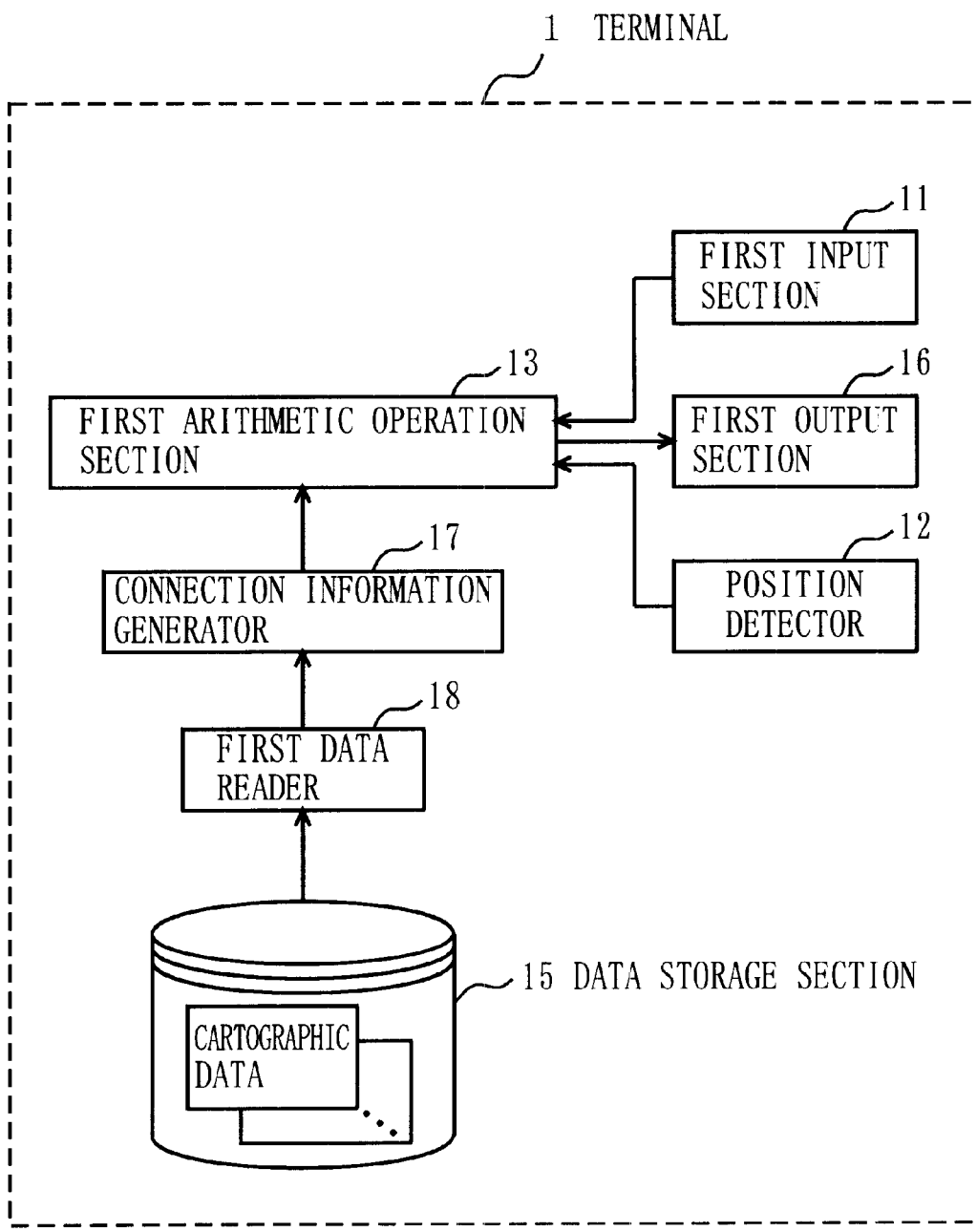
FIG. 1 is a block diagram showing the structure of an information terminal according to a first embodiment of the present invention.

FIG. 1 is a block diagram showing the hardware structure of an information terminal or a functional structure established by executing a program, according to a first embodiment of the present invention. An information terminal 1 is typically implemented by a dedicated vehicle-mounted car navigation device or a general-purpose PDA (Personal Digital Assistant). The program can be stored in an appropriate medium, and then ported to another information terminal for porting the functions achieved by the program.

In FIG. 1, the information terminal 1 includes a first input section 11, a position detector 12, a first arithmetic operation section 13, a data storage section 15, a first data reader 18, a connection information generator 17, and a first output section 16.

If the information terminal section 1 is a car navigation device, the first input section 11 is exemplarily implemented as hardware by a remote controller for remotely controlling the car navigation device or keys arranged on the car navigation device, or as software by buttons displayed on a menu screen of the car navigation device. The first input section 11 may also be implemented by a voice input device using voice recognition technology. A user of the information terminal 1 operates the first input section 11 for making requests for various processes, such as information display selection, information search, etc.

The position detector 12 is implemented by a speed sensor, a gyro sensor, or GPS (Global Positioning System) receive antenna and receiver, and may be by a combination thereof. The speed sensor is used for detecting the moving speed of the information terminal 1 and calculating the distance traveled based on the detection result. The gyro sensor detects the direction of travel by the information terminal 1. The GPS receive antenna and receiver receive radio waves from a satellite. Based on the obtained information, the position detector 12 detects an absolute position on earth of the information terminal 1. Based on inputs from these sensors, the position detector 12 may carry out map matching for correcting the current position to a position on a road by using road network data stored in the data storage section 15, thereby detecting the current position of the information terminal 1. Note that the position detector 12 is not required when the information terminal 1 carries out only the process that does not require current position data.

The first arithmetic operation section 13 carries out various data processes, which will be described later. Such processes include, for example, a guide process for guiding a vehicle or a user carrying the information terminal 1 by reading cartographic data (described later) stored in the data storage section 15.

The data storage section 15 is typically implemented by a data-rewritable storage medium, such as a hard disk drive or flash memory. The data storage section 15 stores the cartographic data for use in position detection, route guidance, etc. The cartographic data stored in the data storage section 15 will be described later in detail.

The first data reader 18 reads a required portion of the cartographic data from the data storage section 15.

The connection information generator 17 complements the cartographic data read by the first data reader 18 by generating and connection information of the road network. The process carried out by the connection information generator 17 for complementing the cartographic data by generating the connection information will be described later in detail. Note that the connection information of the road network generated and complemented by the connection information generator 17 is used mainly in the first arithmetic operation section 13 for carrying out various data processing, such as route search and position detection.

The first output section 16 is typically implemented by a display device and a loudspeaker. The display device displays a map with the current position indicated thereon, and route guide information. The loudspeaker produces the route guide information to the user by voice.

The structure of the information terminal 1 has been described above. Described below is the data structure of the cartographic data for use in the above-structured information terminal 1.

"Data Structure of the Cartographic Data"

Figure 2:
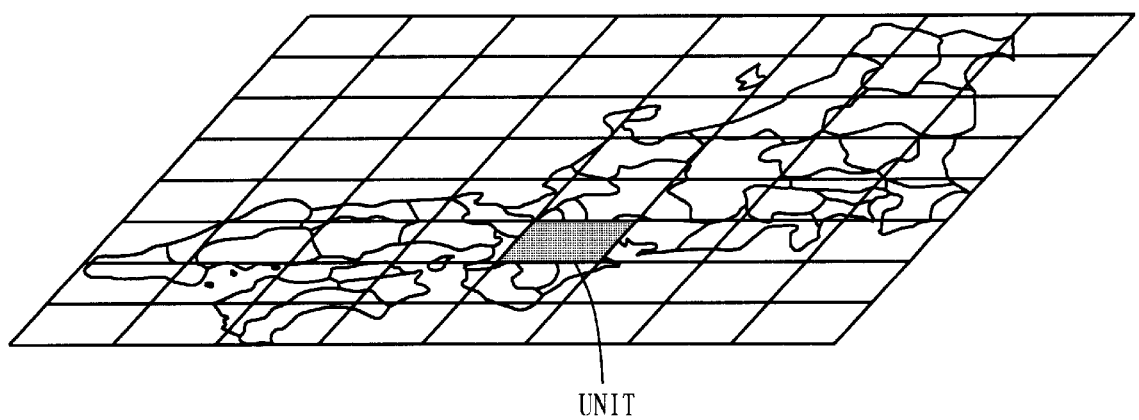
FIGS. 2 to 4 are illustrations each showing a data structure of cartographic data used in the information terminal 1 of FIG. 1.
Figure 3:
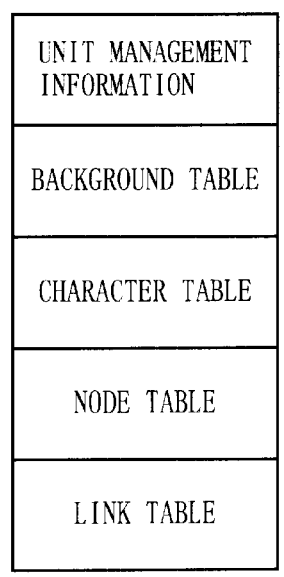
Figure 4:
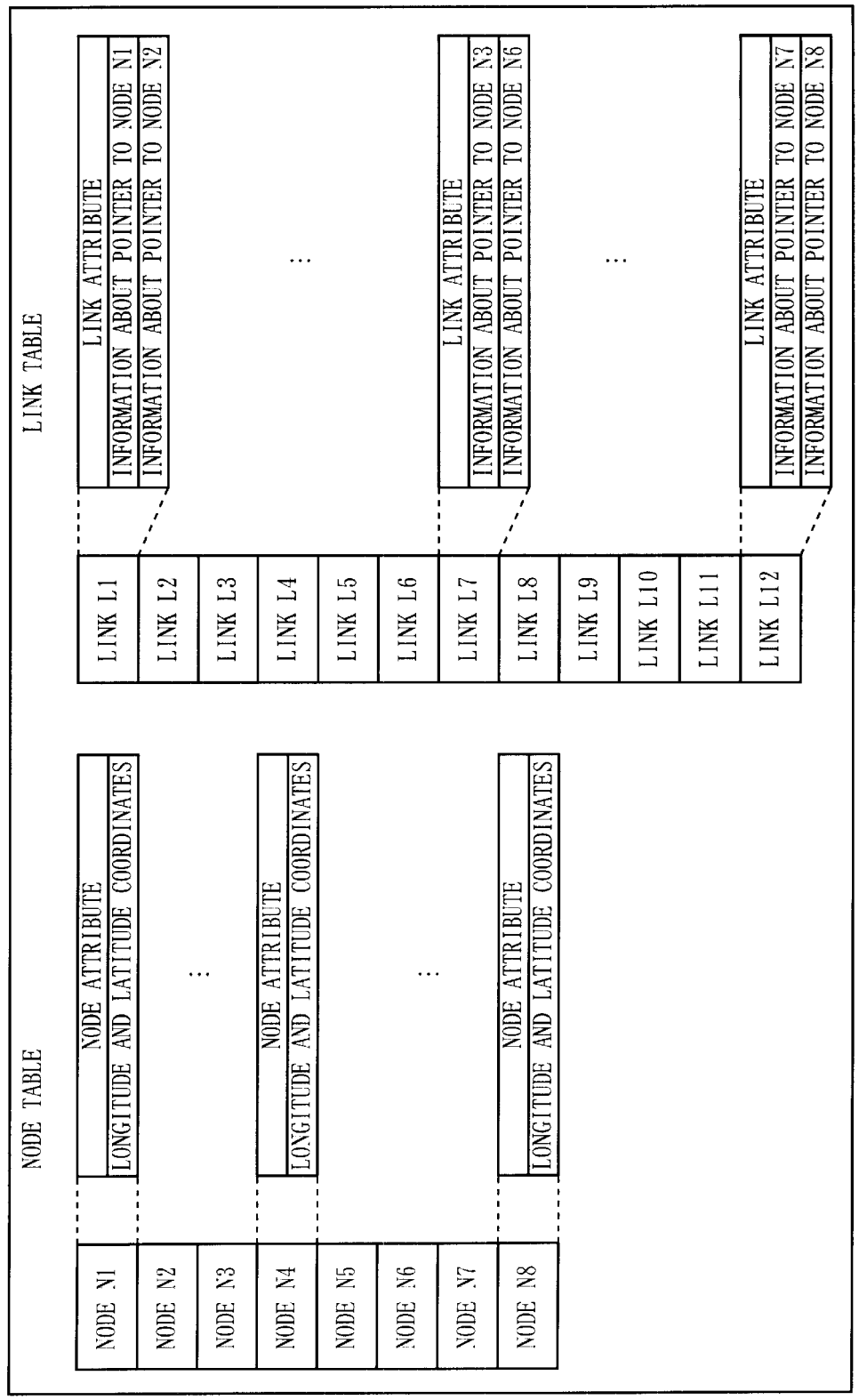

FIGS. 2 to 4 are illustrations each showing a data structure of the cartographic data for use in the information terminal 1. In FIG. 2, the cartographic data of Japan for use in the information terminal 1 is divided by 450 seconds in the longitude direction and 300 seconds in the latitude direction into rectangular units (hereinafter simply referred to as units). Each unit is structured as file data (hereinafter referred to as unit data), and preferably managed by a file system, where each unit is assigned a unit data name capable of uniquely specifying its longitude and latitude coordinates. By way of example only, a unit including a point at 135 degrees, 34 minutes, 31 seconds east longitude and 34 degrees, 44 minutes, 31 seconds north latitude is assigned a unit data name "E1084N416.map" indicating a quotient 1084 obtained by dividing the east longitude (135 degrees, 34 minutes, 31 seconds) by 450 seconds in the longitude direction and a quotient 416 obtained by dividing the north latitude (34 degrees, 44 minutes, 31 seconds) by 300 seconds in the latitude direction. Note that, in the unit data name, "E" represents east longitude, and "N" represents north latitude. With such unit data name assigned to the unit, the longitude and latitude of the area covered by the unit can be easily known. In reverse, with the unit data name, a unit including a given point represented by the longitude and latitude coordinates can be easily specified.

Furthermore, each unit data has the data structure as shown in FIG. 3. In FIG. 3, the unit data is structured by unit management information, a background table, a character table, a node table, and a link table.

The unit management information is information for managing the entire unit data and, specifically, containing offset information indicating, in byte from the head of the unit data, the positions of the respective tables, that is, the background table, the character table, the node table, and the link table. This unit management table enables any desired table to be easily read from the unit data.

The background table contains, as polygon data, map background data excluding the road network data but mainly including data of green areas such as parks and woods, facilities such as factories and airports, water areas such as seas and rivers.

The character table contains character string data mainly required for displaying a map based on the cartographic data and carrying out route guidance. Such character string data includes, for example, place names, intersection names, road names, and facility names.

Note that, in the present embodiment, the background table and the character table do not have any feature unique to the present invention, and therefore are not further described herein.

The node table is a table mainly containing data of intersections on roads (such intersections are hereinafter referred to as nodes) as node data of the road network data. The link table is a table containing data of roads each linking one intersection to another on roads (such roads are hereinafter referred to as links) as link data of the road network data. Described in detail below are these node table and link table.

First, for description of the node table and the link table, an example road network is described. For example, assume that the road network is constructed by eight nodes N1 to N8 and twelve links L1 to L12, as described with reference to FIG. 11. For map matching and route search by the information terminal 1 using such road network, a connection among the nodes and the links has to be traced. By way of example only, consider a case where the shortest route starting from the node N1 to the node N8 is traced as the node N1->the link L2->the node N3->the link It L6->the node N5->the link L9->the node N6->the link L11->the node N8. In this case, the route has to be traced as follows.

Process 1: The node N1 has two links connected thereto, one of which is the link L2.
Process 2: The link L2 is connected to the node N3.
Process 3: The node N3 has five links connected thereto, one of which is the link L6.
Process 4: The link L6 is connected to the node N5.
Process 5: The node N5 has three links connected thereto, one of which is the link L9.
Process 6: The link L9 is connected to the node N6.
Process 7: The node N6 has four links connected thereto, one of which is the link L11.
Process 8: The link L11 is connected to the node N8.

In other words, to detect the shortest route starting from the node N1 to the node N8 in the road network shown in FIG. 11, the connection information has to include node-to-link information indicating which link is connected to each node (Processes 1, 3, 5, and 7), and link-to-node information indicating which node is connected to each link (Processes 2, 4, 6, and 8).

FIG. 4 is an illustration showing the data structure of the node table and that of the link table stored as the road network data representing the road network shown in FIG. 11. In FIG. 4, the node table describes eights node records respectively recording information corresponding to the eight nodes N1 to N8. The link table describes twelve link records respectively recording information corresponding to the twelve links L1 to L12.

Each node record described in the node table stores data representing an attribute and coordinates of the node. Each link record described in the link table stores data representing an attribute of the link. Furthermore, each link record stores pointer information about a pointer to the location of a node record corresponding to the node connected to that link (this pointer information about the pointer to the node record corresponds to the link-to-node connection information described above). For example, on the road network shown in FIG. 11, the link L2 is connected to the nodes N1 and N3. Therefore, the pointer information in the link record of the link L2 describes the pointer information about the pointer to the nodes N1 and N3.

Figure 12:
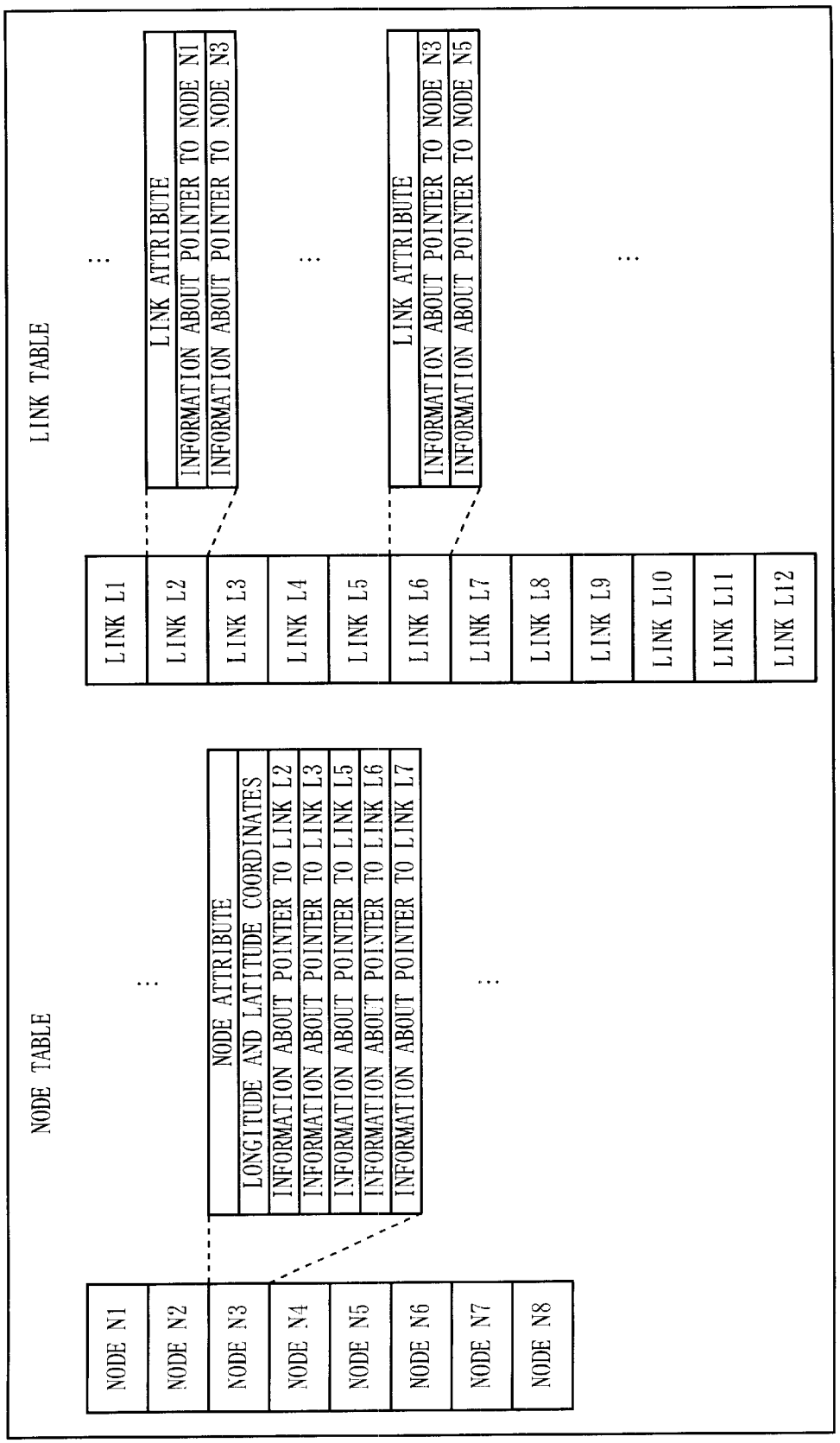
FIG. 12 is an illustration showing an example data structure of a conventional road network data representing the road network shown in FIG. 11.

As such, in the data structure of the cartographic data used in the information terminal 1, each node record in the node table does not describe information about the number of links connected to the node and information about a pointer to the location of a link record corresponding to a link connected to that node. That is, each node record does not describe the above-described node-to-link connection information, which corresponds to information about the number of links and the pointer information about a pointer to a link. Therefore, compared with the conventional cartographic data as shown in FIG. 12 in Background Art, the cartographic data for representing the road network can be far reduced in amount.

In the cartographic data with the above-structured node table described therein, however, the connection among the nodes and the links is not efficiently traced for map matching and route search. Therefore, the cartographic data is once read from the data storage section 15 to main memory, so unwound and developed as to have a data structure enabling the connection information to be easily traced, and then used. How to develop the cartographic data on the main memory and the structure of the unwound cartographic data will be described later.

The structure of the information terminal 1 and the data structure of the cartographic data have been described above. Described below is the procedure carried out by the information terminal 1.

"Procedure Carried Out by the Information Terminal 1"

As stated above, the information terminal 1 is typically implemented by a car navigation device or a PDA. As well known, the vehicle-mounted car navigation device executes map matching, route search, and route guidance. Of these processes, the route search process is taken herein as an example for describing in detail the procedure of reading the cartographic data by the information terminal 1.

In the road network shown in FIG. 11, to find the shortest route starting from the node N1 to the node N8, the information terminal 1 calculates respective arrival costs for routes from the node N1 to the node N8, and selects a route whose arrival cost becomes minimum. To calculate such arrival costs, a connecting relation among all nodes and links constructing the road network has to be sequentially traced.

The data structure of the car tographic data used in the information terminal 1 has already been described in "Data structure of cartographic data" with reference to FIGS. 2 to 4. However, there is a drawback in such data structure as shown in FIG. 4, where the node table does not describe pointer information pointing from each node record to the corresponding link record. With the cartographic data having the above data structure, it is not possible to efficiently trace a route on the road network shown in FIG. 11 starting from the node N1->the link L2->the node N3->the link L6->the node N5->the link L9->the node N6->the link L11->the node N8. This is because each link record described in the link table of FIG. 4 does record information about which nodes are connected to both ends of the link, but each node record described in the node table does not record information about which and how many links are connected to the node. For this reason, for every arrival at a node, the information terminal 1 has to search the link table for links connected to the node in order to trace the connection among the nodes and the links. This is not efficient for finding the connecting relation among the nodes and links quite often.

Therefore, to use the cartographic data for route search or other processing, the information terminal 1 once reads the cartographic data from the data storage section 15 through the first data reader 18, then develops the read data by the connection information generator 17 into the one having a data structure enabling the connecting relation among the nodes and the links to be easily traced, and arranges the developed data on the main memory.

Figure 5:
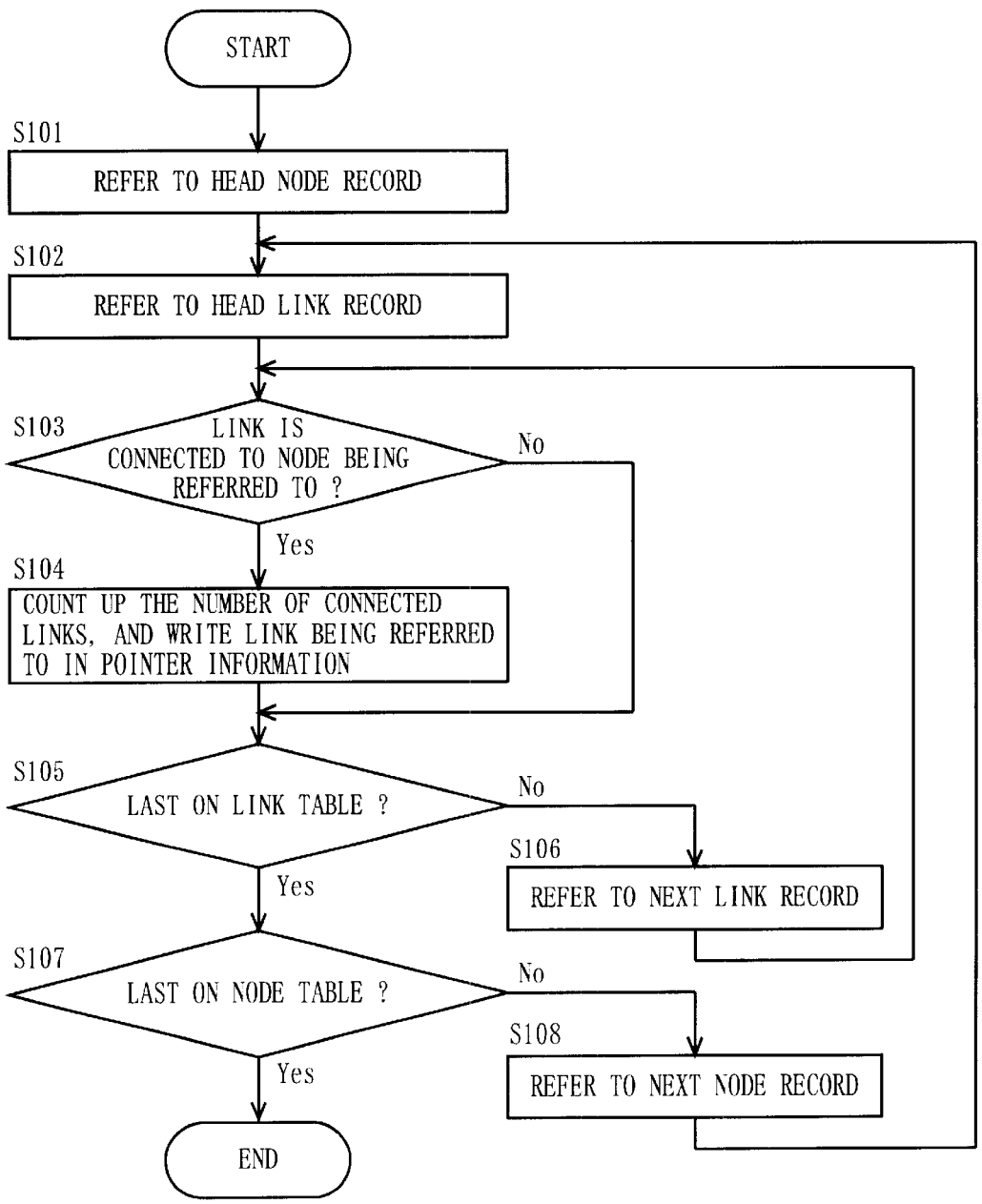
FIG. 5 is a flowchart showing the procedure carried out by a connection information generator 17 on cartographic data read by a first data reader 18 of FIG. 1.

Described next is the procedure carried out by the connection information generator 17 of the information terminal 1 for reading the cartographic data for development. FIG. 5 is a flowchart showing the procedure carried out by the connection information generator 17 onto the cartographic data read by the first data reader 18.

In FIG. 5, the connection information generator 17 refers to a head node record described in the node table of the cartographic data read by the first data reader 18 (step S101). For example, in a case where the node table has the data structure as shown in FIG. 4, the connection information generator 17 refers to the node record corresponding to the node N1.

The connection information generator 17 then refers to a head link record described in the link table (step S102). For example, in this case, the connection information generator 17 refers to the link record corresponding to the link L1.

The connection information generator 17 then determines whether the link record being referred to describes pointer information about a pointer to the node record being referred to (step S103). For example, when the link record corresponding to the link L1 being referred to is for the node record corresponding to the node N1 shown in FIG. 4, the connection information generator 17 determines that the link record that referred to describes that pointer information about the pointer to the node record being referred to. If so in step S103, the procedure goes to step S104. If the connection information generator 17 determines otherwise, the procedure goes to step S105.

In step S104, the connection information generator 17 counts up a counter for counting the number of links connected to the node corresponding to the node record being referred to, and writes pointer information about a pointer to the link record being referred to (step S104). In the same example, the connection information generator 17 writes pointer information about a pointer to the link L1 in the node record being referred to, taking the number of connected links as 1.

The connection information generator 17 then determines whether the link record being referred to is the last record in the link table (step S105). If the link record is the last record, the procedure goes to step S107. If the link record is not the last record, the connection information generator 17 refers to the next link record (step S106), and returns to step S103.

The connection information generator 17 then determines whether the node record being referred to is the last record in the node table (step S107). If the node record is the last record, the procedure ends. If the node record is not the last record, the connection information generator 17 refers to the next node record (step S108), and returns to step S102.

Figure 6:
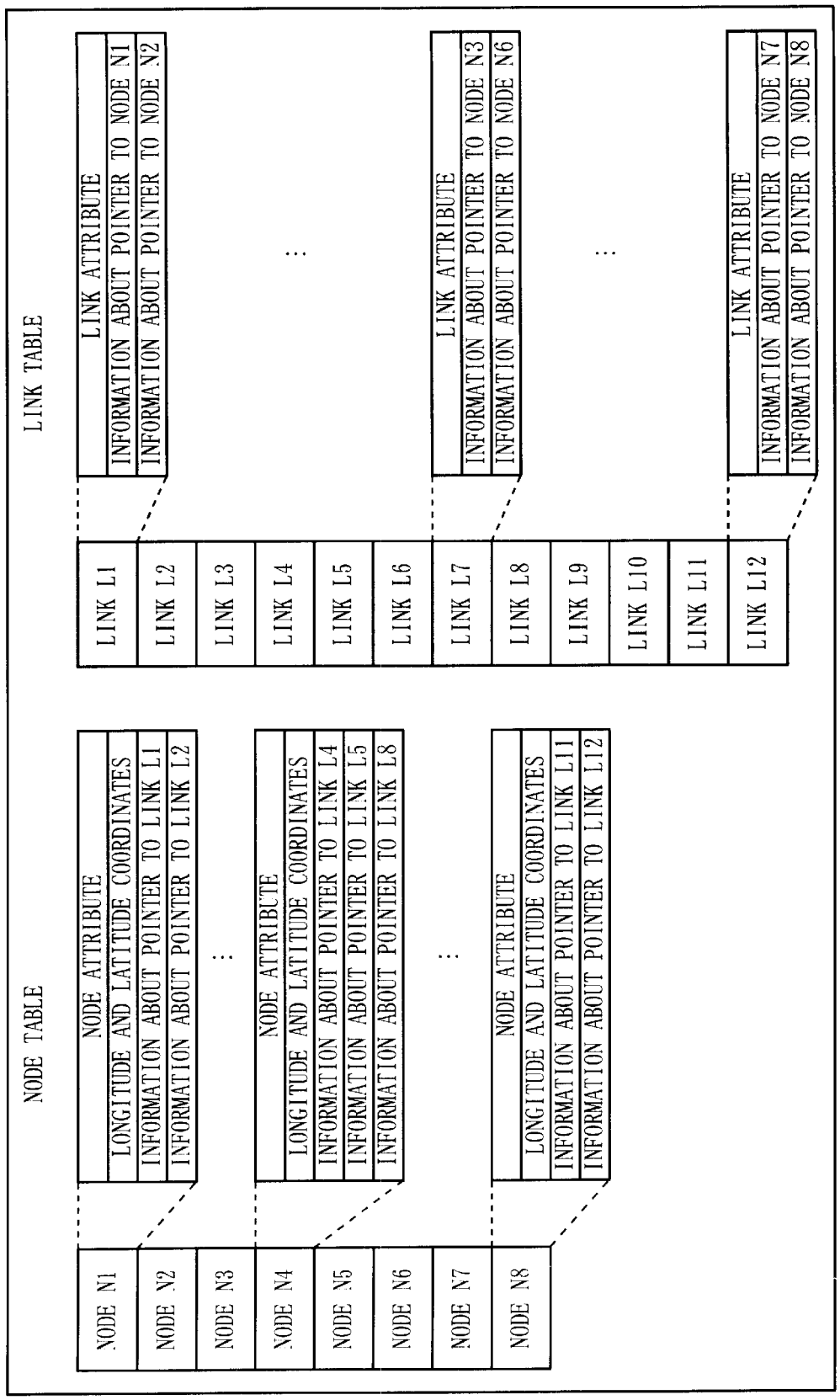
FIG. 6 is an illustration of the data structure of cartographic data generated by the connection information generator 17 of FIG. 1.

By the connection information generator 17 repeating the above processing until coming to the last record in the node table, it is possible to obtain the number of links connected to the respective nodes and the pointer information about the pointer to the link record corresponding to the respective connected link. With this procedure, the node table is developed into the one having a data format as shown in FIG. 6, which is similar to the data structure described in Background Art. The node table having such data format can be then arranged on the main memory by the connection information generator 17. As such, if the connection information generator 17 arranges on the main memory the node table and the link table having data formats similar to those shown in FIG. 12 and described in Background Art, the connection among the nodes and the links can be efficiently traced by the first arithmetic operation section 13, as already described in Background Art. Therefore, it is possible to quickly carry out route search or other processing. Note that the route search process is carried out with the Dijkstra Algorithm, which have been well known and therefore not further described herein.

In addition to the route search process, the information terminal 1 also carries out map matching for correcting the current position of the information terminal 1 to a position on the road network represented by the cartographic data, and based on the results of route search and map matching, carries out route guidance from the starting point to the destination. These processes are also efficiently carried out, because, when the cartographic data is read into the main memory, the connection information of the road network is used after being developed by the connection information generator 17 into a data format that is easy to trace. Details of these map matching and route search processes are also not unique to the present invention, and therefore not described in detail herein.

As such, only the minimum required connection information of the road network represented by the digital cartographic data is stored in the data storage section 15, thereby minimizing the amount of cartographic data. Furthermore, for tracing the connecting relation among roads for map matching, route search, etc., the cartographic data is read from the data storage section 15 by the data reader 18, and developed by the connection information generator 17 into a data structure enabling the connecting relation among the roads to be efficiently traced for arrangement on the main memory. Thus, although the connection information contained in the cartographic data is simplified, the cartographic data can be used without impairing processing performance in map matching, route search, etc.

In the present embodiment, the data storage section 15 for storing the cartographic data is a writable recording medium such as a hard disk or flash memory. Alternatively, a read-only medium such as CD-ROM or DVD-ROM may be used.

Also, the data structures of the node table and the link table are not limited to the examples described in the present embodiment. Any data structures having capabilities similar to those in the present embodiment are possible.

Furthermore, in the first embodiment, a car navigation device and a PDA are assumed to be examples of the information terminal 1. The present embodiment can also be applied to a personal computer for displaying a map or searching for a route based on a cartographic database generated therein. That is, the present invention can be applied not only to movable terminals but also to fixed-type terminals. In the latter case, the position detector 12 may not be required.

Still further, in the first embodiment, as to the connecting relation among the nodes and links constructing the road network, the cartographic data is so structured as to store only information about connection from the links to the nodes. When the cartographic data is read, information about connection from the nodes to the links is generated in the node table by using the information about connection from the links to the nodes described in the link table. In general, the information about connection from the nodes to the links is larger in amount than the information about connection from the links to the nodes. Therefore, the above structure is quite effective to reduce the amount of cartographic data. Alternatively, if such effect is not much required, the cartographic data may be so structured as to store only information about connection from the nodes to the links. In this case, when the cartographic data is read, information about connection from the links to the nodes is generated in the link table by using the information about connection from the nodes to the links described in the node table.

(Second Embodiment)

"System structure"

Figure 7:
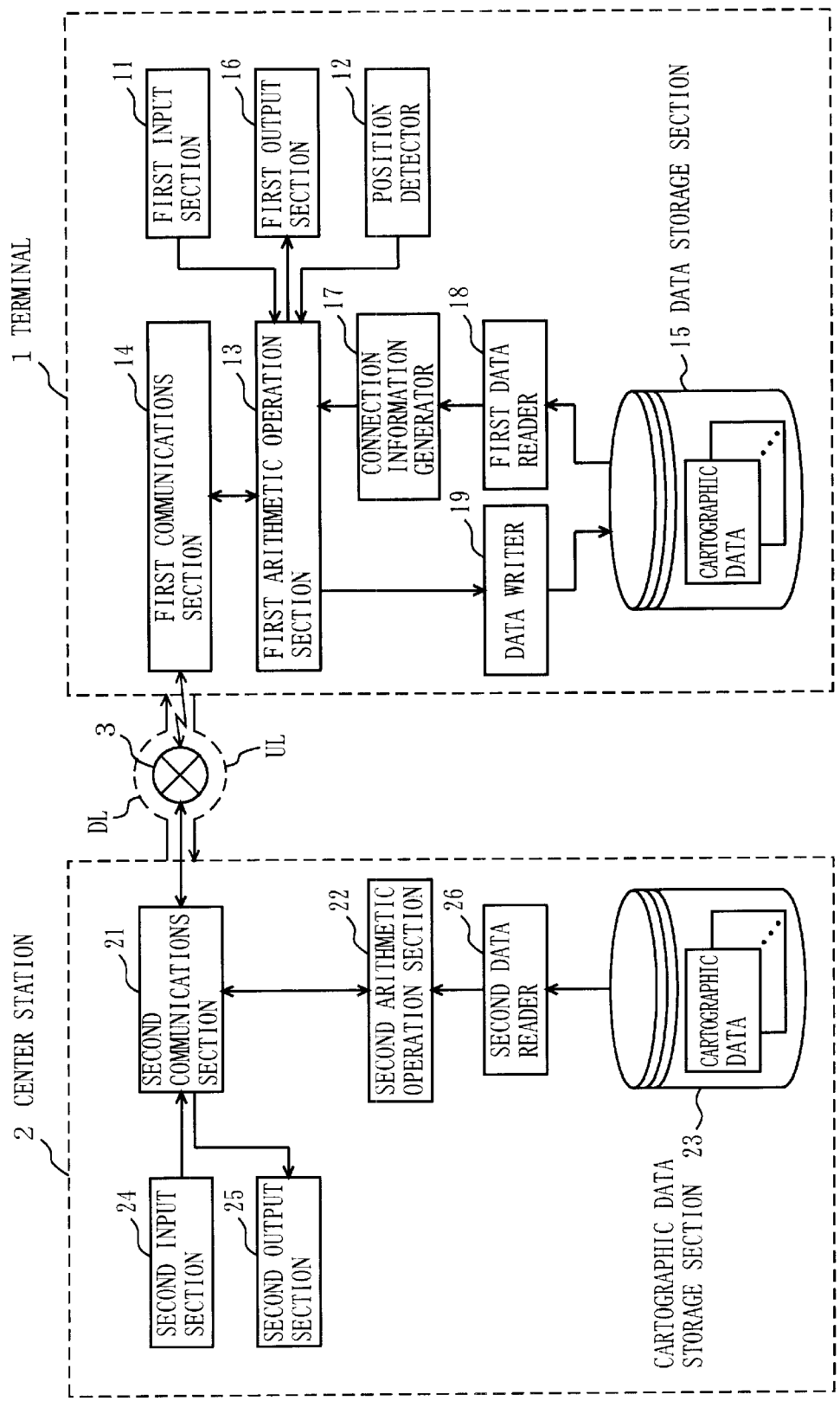
FIG. 7 is a block diagram showing the configuration of an information terminal and a cartographic information providing system according to a second embodiment of the present invention.

FIG. 7 is a block diagram showing the hardware structure of an information terminal and a cartographic information providing system, or a functional structure established by executing a program, according to a second embodiment of the present invention. An information terminal 1 is typically implemented by a dedicated vehicle-mounted car navigation device or a general-purpose PDA. The program can be stored in an appropriate medium, and then ported to another information terminal for porting the functions achieved by the program.

In FIG. 7, the cartographic information providing system includes the information terminal 1 and a center station 2. The information terminal 1 and the center station 2 are connected to each other for bi-directional communications via a communications network 3. More specifically, between the information terminal 1 and the center station 2, an uplink UL and a downlink DL are formed. The uplink UL means a communications path from the information terminal 1 to the center station 2. The downlink DL means a communications path from the center station 2 to the information terminal 1. Here, typical examples of the communications network 3 are a communications network for mobile terminals typified by cell phones, a public circuit typified by ISDN (Integrated Services Digital Network) or dedicated circuit, or any combination thereof. Via the communications network 3, the information terminal 1 may directly access to the center station 2, but, in general, indirectly accesses to the center station 2 via an ISP (Internet Service Provider) through its access point. At this time, the communications protocol used by the information terminal 1 and the ISP is a PPP (Point-to-Point Protocol) in general. Using the PPP enables exchange of Internet-standard TCP/IP packets. Therefore, data transmitted and received via the uplink UL from the information terminal 1 to the center station 2 and via the downlink DL from the center station 2 to the information terminal 1 is contained in a TCP/IP packet. To simplify the following description, the processing based on the PPP and the TCP/IP, which are well known, are not described herein in detail.

Described next is the structure of the information terminal 1. The information terminal 1 includes a first input section 11, a position detector 12, a first arithmetic operation section 13, a first communications section 14, a data storage section 15, a first data reader 18, a connection information generator 17, a data writer 19, and a first output section 16.

If the information terminal section 1 is a car navigation device, the first input section 11 is exemplarily implemented as hardware by a remote controller for remotely controlling the car navigation device or keys arranged on the car navigation device, or as software by buttons displayed on a menu screen of the car navigation device. The first input section 11 may also be implemented by a voice input device using voice recognition technology. A user of the information terminal 1 operates the first input section 11 for making requests for various processes, such as information display selection, information search, etc.

The position detector 12 is implemented by a speed sensor, a gyro sensor, or GPS (Global Positioning System) receive antenna and receiver, and may be by a combination thereof. The speed sensor is used for detecting the moving speed of the information terminal 1 and calculating the distance traveled based on the detection result. The gyro sensor detects the direction of travel by the information terminal 1. The GPS receive antenna and receiver receive radio waves from a satellite. Based on the obtained information, the position detector 12 detects an absolute position on earth of the information terminal 1. Based on inputs from these sensors, the position detector 12 may carry out map matching for correcting the current position to a position on a road by using road network data stored in the data storage section 15, thereby detecting the current position of the information terminal 1. Note that the position detector 12 is not required when the information terminal 1 carries out only the process that does not require current position data.

The first arithmetic operation section 13 carries out various data processes, which will be described later. Such processes includes, for example, a guide process for guiding a vehicle or a user carrying the information terminal 1 by reading cartographic data (described later) stored in the data storage section 15.

The first communications section 14 is typically implemented by a communications device for mobile terminals typified by cell phones. The first communications section 14 sends to the uplink UL of the communications network 3 a request message REQ supplied by the first arithmetic operation section 13 for making a request from the information terminal 1 to the center station 2. The request message REQ includes at least a request command for requesting cartographic data, and coordinate information for specifying an area to be requested on a map represented by the cartographic data, which will be described later in detail.

The request message REQ sent from the information terminal 1 goes through the uplink UL of the communications network 3 to the center station 2. The center station 2 analyzes the received request message REQ, reads the relevant cartographic data stored in the cartographic data storage section 23, and sequentially transmits the read data via the downlink DL of the communications network 3 to the information terminal 1. The processing in the center station 2 will be described later in detail.

In the information terminal 1, the first communications section 14 receives the cartographic data sent via the downlink DL of the communications network 3 from the center station 2, and outputs the data to the first arithmetic operation section 13. The first arithmetic operation section 13 makes the received cartographic data stored in the data storage section 15. The first arithmetic operation section 13 also carries out various processes by using the cartographic data stored in the data storage section 15, such as map display, position detection, route search, route guidance, etc.

The data storage section 15 is typically implemented by a data-rewritable storage medium, such as a hard disk drive or flash memory. The data storage section 15 stores the cartographic data for use in position detection, route guidance, etc. The cartographic data stored in the data storage section 15 will be described later in detail.

The first data reader 18 reads a required portion of the cartographic data from the data storage section 15.

The connection information generator 17 complements the cartographic data read by the first data reader 18 by generating and complementing connection information of the road network. The processes for generating the connection information carried out by the connection information generator 17 will be described later in detail. Note that the connection information of the road network generated by the connection information generator 17 is used mainly in the first arithmetic operation section 13 for carrying out various data processing, such as route search and position detection.

The data writer 19 writes data in the data storage section 15 when instructed by the first arithmetic operation section 13. The data writer 19 mainly writes the cartographic data received via the first communications section 14 from the center station 2 in the data storage section 15.

The first output section 16 is typically implemented by a display device and a loudspeaker. The display device displays a map with the current position indicated thereon, or guide information. The loudspeaker produces the guide information to the user by voice.

Described next is the structure of the center station 2. The center station 2 includes a second communications section 21, a second arithmetic operation section 22, a cartographic data storage section 23, a second data reader 26, a second input section 24, and a second output section 25.

As stated above, the center station 2 receives the request message REQ transmitted by the information terminal 1 via the uplink UL of the communications network 3. The second communications section 21 is implemented by a communications device typified by a modem, a terminal adaptor, or a gateway. Here, the gateway means not only a device or a function for connecting the communications network 3 and the center station 2 that use different communications protocols from each other, but also a device or a function for preventing unauthorized access to the center station 2 via the communications network 3. The second communications section 21 is connected to the communications network 3, controlling data reception from the information terminal 1 and data transmission to the information terminal 1. More specifically, the second communications section 21 has a function of receiving the request message REQ transmitted via the uplink UL of the communications network 3 and outputting it to the second arithmetic operation section 22.

The second arithmetic operation section 22 analyzes the received request message REQ. As stated above, the request message REQ includes at least coordinate information for specifying an area to be requested on a map represented by the cartographic data, and a request command for requesting data of the specified area, which will be described later in detail. The second arithmetic operation section 22 also gives the second data reader 26 an instruction for reading the cartographic data stored in the cartographic data storage section 23 based on the request message REQ.

The cartographic storage section 23 is typically implemented by a hard disk drive, a CD-ROM drive, or a DVD-ROM drive, being composed of at least a recording medium allowing the cartographic data recorded thereon to be read, and a driver.

The second data reader 26 reads the cartographic data stored in the cartographic data storage section 23 when instructed by the second arithmetic operation section 22, and outputs the read data to the second arithmetic operation section 22.

The cartographic data read by the second data reader 26 and outputted to the second arithmetic operation section 22 is sent via the second communications section 21 to the downlink DL of the communications network 3, and then sequentially forwarded to the information terminal 1.

The second input section 24 is implemented by an input device for use mainly in a computer system, such as a keyboard or a mouse. Using the second input section 24, the operator enters various processing requests for operating and managing the center station 2.

The second output section 25 is typically implemented by a display device. The display device mainly displays an image based on the road network data stored in the cartographic data storage section 23.

The overall structure of the cartographic information providing system, and the structures of the information terminal 1 and the center station 2 have been described above. Described below is the data structure of the cartographic data used in the cartographic information providing system.

"Data Structure of the Cartographic Data"

The data structure of the cartographic data for use in the cartographic information providing system is similar to that already described in the first embodiment with reference to FIGS. 2 to 4, and therefore not described herein in detail. In the present embodiment, the above-structured cartographic data is stored in the cartographic data storage section 23 of the center station 2, and distributed to the information terminal 1 upon request thereby via the communications network 3. The information terminal 1 receives the cartographic data distributed from the center station 2, stores it in the data storage section 15, and reads it onto the main memory as required for use.

As described in the first embodiment, the cartographic data for use in the present embodiment has the connection information of the road network limited to minimum, and therefore is smaller in amount than the conventional cartographic data. Thus, it is possible to reduce time and cost required for communications at the time of data distribution from the center station 2 to the information terminal 1. Also, when the cartographic data reduced in amount and distributed to the information terminal 1 is stored in the data storage section 15 of the information terminal 1, the amount of space on the data storage section 15 taken up by the cartographic data can be saved. Furthermore, the data storage section 15 of the information terminal 1 can be reduced in storage capacity, and therefore the information terminal 1 can also be reduced in cost.

"Procedure Carried out by the Information Terminal 1"

As described above, the information terminal 1 is typically a car navigation device or a PDA. As well known, the vehicle-mounted car navigation device carries out map matching, route search, and route guidance by using cartographic data having the data structure as described in the first embodiment. The procedure carried out by the information terminal 1 for reading the cartographic data is similar to that described exemplarily for route search in the first embodiment, and therefore not described herein in detail.

The cartographic information providing system is characterized in that the information terminal 1 receives and uses the cartographic data distributed from the center station 2 via the communications network 3. Described below is the processing of transmission and reception of the cartographic data between the center station 2 and the information terminal 1.

"Transmission and Reception of the Cartographic Data"

In recent years, systems where cartographic data is provided by the center station 2 to the information terminal 1 have been studied and developed. With such system, the information terminal 1 can obtain necessary cartographic data when necessary. To achieve this, the cartographic data storage section 23 of the center station 2 is provided with cartographic data covering a wide area for distribution to the information terminal 1. In the present embodiment, the cartographic data stored in the cartographic data storage section 23 and the data storage section 15 has the data structure as described in the first embodiment with reference to FIGS. 2 to 4.

FIG. 8 is a flowchart showing the procedure carried out by the information terminal 1 for requesting the center station 2 to transmit the cartographic data covering a requested area.

FIG. 9 is an illustration showing an example data format of a request message REQ transmitted from the information terminal 1 with the procedure of FIG. 8. In FIG. 8, when the user of the information terminal 1 wants to receive the cartographic data from the center station 2 to make an addition to or update the cartographic data stored in the data storage section 15, the user operates the first input section 11 to start a function of requesting and receiving the cartographic data. Then, by following a menu screen displayed on a display of the first output section 16, the user operates the first input section 11 to input a requested map area in the cartographic data. In response to the user's input, the first input section 11 outputs information indicating the map area to the first arithmetic operation section 13 to specify the area (step S201). Here, the user uses the first input section 11 to specify the map area by, for example, surrounding a desired area on the wide-area map on display with a rectangular shape, or using an address index. Alternatively, the user may specify the current position of the information terminal 1 or an arbitrary point on the map. In this case, the first input section 11 outputs, in response to the user's input, information indicating a point on the map to the first arithmetic operation section 13.

Supplied with the information indicating the area or point outputted from the first input section 11, the first arithmetic operation section 13 converts the information to longitude and latitude coordinates. The first arithmetic operation section 13 then generates a request message REQ by using the information about the longitude and latitude coordinates (step S202).

FIG. 9A shows an example data format of the request message REQ generated by the first arithmetic operation section 13 when an area on the map is specified in step S201. In FIG. 9A, the request message REQ is composed of a cartographic data request command, and longitude and latitude coordinates specifying the area requested by the user and being represented based on the cartographic data. Here, more specifically, when the user specifies an area on the wide-area map with a rectangular shape, the longitude and latitude coordinates are composed of a lower-left longitude coordinate, a lower-left latitude coordinate, an upper-right longitude coordinate, and an upper-right latitude coordinate.

FIG. 9B shows an example data format of the request message REQ generated by the first arithmetic operation section 13 when a point on the map is specified in step S201. In FIG. 9B, the request message REQ is composed of a cartographic data request command, and a longitude and latitude coordinates specifying the point requested by the user and represented based on the cartographic data. Here, more specifically, when the user specifies the current position of the information terminal 1 or an arbitrary point on the map, the longitude and latitude coordinates indicate the point specified by the user.

The first arithmetic operation section 13 then outputs the generated request message REQ to the first communications section 14. The first communications section 14 sends the received request message REQ to the uplink UL for transmission to the center station 2 (step S203). The processing by the flowchart now ends.

Described next is the transmission of the cartographic data by the center station 2. FIG. 10 is a flowchart showing the procedure carried out by the center station 2 for transmitting the cartographic data.

In FIG. 10, the request message REQ sent from the information terminal 1 goes through the uplink UL of the communications network 3 to the second communications section 21 of the center station 2 (step S301). The request message REQ is then forwarded to the second arithmetic operation section 22.

The second arithmetic operation section 22 then analyzes the request included in the request message REQ transmitted from the information terminal 1 (step S302). This analysis is carried out by the longitude and latitude coordinates described in the request message REQ. As described in the first embodiment, the cartographic data used in the cartographic information providing system is divided into units. Each unit is structured as unit data, and managed by a file system, where each unit data is assigned a unit data name capable of uniquely specifying the longitude and latitude coordinates corresponding to the unit data. In other words, by analyzing the unit data name, it is possible to uniquely specify the unit including the longitude and latitude coordinates described in the request message REQ.

The second arithmetic operation section 22 then causes the second data reader 26 to search the cartographic data storage section 23 for the relevant cartographic data requested by the information terminal 1 based on the result of analysis of the request message REQ (step S303).

The second arithmetic operation section 22 then converts the cartographic data read in step S303 by the second data reader 26 to the one having a data structure suitable for transmission and reception via the communications network 3 (step S304), and then outputs the converted data to the second communications section 21 Note that the protocol for use in data transmission and reception via the communications network 3 is not unique to the present embodiment, and therefore not described herein in detail.

The second communications section 21 sends the data supplied by the second arithmetic operation section 22 to the downlink DL of the communications network 3 (step S305), and then ends the flow.

As such, with the processing in steps S301 to S305, the center station 2 can transmit the requested cartographic data to the information terminal 1.

Described next is the process for receiving the cartographic data by the information terminal 1. The data transmitted from the center station 2 in step S305 is supplied via the downlink DL of the communications network 3 to the first communications section 14 of the information terminal 1. The first communications section 14 sequentially receives the data coming via the downlink DL of the communications network 3, and outputs it to the first arithmetic operation section 13. The first arithmetic operation section 13 sequentially receives the data outputted from the first communications section 14, and reconstructs it as the cartographic data. Note that the processing carried out between reception of the data coming via the downlink DL of the communications network 3 and data reconstruction by the first arithmetic operation section 13 is not unique to the present embodiment, and therefore not described herein in detail. The data reconstructed as the cartographic data is stored by the data writer 19 in the data storage section 15.

The cartographic data stored in the data storage section 15 is read to the data reader 18 as required for use in map display, position detection, route search, route guidance, etc. Note that the processing after the cartographic data is read by the first data reader 18 from the data storage section 15 is similar to that carried out by the information terminal 1 according to the first embodiment. That is, the cartographic data is so processed as to have the connection information of the road network generated and complemented by the connection information generator 17, and then used for various data processes.

As such, in the cartographic information providing system constructed by the center station 2 and the information terminal 1, the cartographic data with the minimum-required connection information of the road network is transmitted from the center station 2 via the communications network 3 to the information terminal 1. Thus, it is possible to reduce the communications time required for data transmission and, consequently, reduce communications cost. Also, as stated above, the cartographic data with the minimum-required connection information of the road network is distributed from the center station 2 to the information terminal 1, and stored in the data storage section 15 of the information terminal 1. Thus, it is possible to save space for storing the cartographic data in the data storage section 15 and, consequently, to reduce cost in the information terminal 1. Furthermore, when the cartographic data stored in the data storage section 15 is read for use in the processes such as map display, position detection, route search, route guidance, etc., the connecting relation in the road network can be efficiently traced without impairing functions of the processes.

In the second embodiment, a car navigation device and a PDA are assumed to be examples of the information terminal 1. The present embodiment can also be applied to a personal computer for displaying a map or searching for a route based on a cartographic database generated therein. That is, the present invention can be applied not only to movable terminals but also to fixed-type terminals. In the latter case, the position detector 12 may not be required, and the communications network 3 may be a wired transmission path.

Also, in the present embodiment, the information terminal 1 bi-laterally communicates with the center station 2 via the communications network 3, reporting a map area or point required by the user to the center station 2 for receiving the cartographic data corresponding to the map area or point. Alternatively, the center station 2 may transmit the cartographic data to the information terminal 1 in a broadcast.

In the second embodiment, as to the connecting relation among the nodes and links constructing the road network, the cartographic data is so structured as to store only information about connection from the links to the nodes. When the cartographic data is read, information about connection from the nodes to the links is generated in the node table by using the information about connection from the links to the nodes described in the link table. In general, the information about connection from the nodes to the links is larger in amount than the information about connection from the links to the nodes. Therefore, the above structure is quite effective to reduce the amount of cartographic data. Alternatively, if such effect is not much required, the cartographic data may be so structured as to store only information about connection from the nodes to the links. In this case, when the cartographic data is read, information about connection from the links to the nodes is generated in the link table by using the information about connection from the nodes to the links described in the node table.

As such, according to the present invention, the digital cartographic data stored in the cartographic data storage section has the connecting relation among nodes and links constructing the road network required for carrying out position detection, route search, etc., and the connecting relation is so recorded as being partly omitted but capable of being recovered. Therefore, it is possible to reduce the amount of cartographic data. As a result, the cartographic data storage section can store data covering a larger area or save its storage space. Also, the partly-omitted connection information is complemented by the connection information generator. Therefore, it is possible to trace the connecting relation of the road network without impairing efficiency of processes such as position detection and route search using the cartographic data, which is an advantageous effect.

While the invention has been described in detail, the foregoing description is in all aspects illustrative and not restrictive. It is understood that numerous other modifications and variations can be devised without departing from the scope of the invention.

What is claimed is:

1. An information terminal for processing cartographic data including node data representing intersections on roads as nodes and link data representing the roads as links, the terminal comprising:

a cartographic data storage section for storing the cartographic data; and a cartographic data processing section for processing the cartographic data stored in the cartographic data storage section, the cartographic data stored in the cartographic data storage section only having one-side connection information described therein, the one-side connection information indicating a connecting relation viewed in a direction from one of the nodes and the links to another one, and the cartographic data processing section comprising:

a cartographic data reader for reading a required portion of the cartographic data from the cartographic data storage section;

a complementing section for complementing the read cartographic data by generating another-side connection information based on the one-side connection information described in the cartographic data read by the cartographic data reader, the other-side connection information indicating a connecting relation viewed in a direction reverse to the direction taken in the one-side connection information; and a cartographic data arithmetic operation section for carrying out an arithmetic operation on the cartographic data complemented with the other-side connection information.

2. The information terminal according to claim 1, wherein the cartographic data stored in the cartographic data storage section includes node connection information indicating a connecting relation viewed from the links to the nodes as the one-side connection information, and the complementing section complements the read cartographic data by generating, based on the node connection information included in the cartographic data read by the cartographic data reader, link connection information indicating a connecting relation viewed from the nodes to the links as the other-side connection information.

3. The information terminal according to claim 1, wherein the cartographic data stored in the cartographic data storage section includes link connection information indicating a connecting relation viewed from the nodes to the links as the one-side connection information, and the complementing section complements the read cartographic data by generating, based on the link connection information included in the cartographic data read by the cartographic data reader, node connection information indicating a connecting relation viewed from the links to the nodes as the other-side connection information.

4. A cartographic information providing system in which an information terminal for processing cartographic data including node data representing intersections on roads as nodes and link data representing the roads as links is provided with the cartographic data from a center station via a transmission path, the center station comprising:
a first cartographic data storage section for storing the cartographic data; and
a cartographic data transmitter for reading the cartographic data requested by the information terminal from the first cartographic data storage section and transmitting the read cartographic data to the information terminal via the transmission path, the information terminal comprising:
a cartographic data receiver for receiving the cartographic data transmitted from the center station via the transmission path;
a second cartographic data storage section for storing the cartographic data received by the cartographic data receiver; and
a cartographic data processing section for processing the cartographic data stored in the second cartographic data storage section, the cartographic data transmitted from the center station only having one-side connection information described therein, the one-side connection information indicating a connecting relation viewed in a direction from one of the nodes and the links to another one, and the cartographic data processing section comprising:
a cartographic data reader for reading a required portion of the cartographic data from the cartographic data storage section;
a complementing section for complementing the read cartographic data by generating another-side connection information based on the one-side connection information described in the cartographic data read by the cartographic data reader, the other-side connection information indicating a connecting relation viewed in a direction reverse to the direction taken in the one-side connection information; and
a cartographic data arithmetic operation section for carrying out an arithmetic operation on the cartographic data complemented with the other-side connection information.

5. The cartographic information providing system according to claim 4, wherein
the cartographic data transmitted from the center station includes node connection information indicating a connecting relation viewed from the links to the nodes as the one-side connection information, and
the complementing section complements the read cartographic data by generating, based on the node connection information included in the cartographic data read by the cartographic data reader, link connection information indicating a connecting relation viewed from the nodes to the links as the other-side connection information.

6. The cartographic information providing system according to claim 4, wherein
the cartographic data transmitted from the center station includes link connection information indicating a connecting relation viewed from the nodes to the links as the one-side connection information, and
the complementing section complements the read cartographic data by generating, based on the link connection information included in the cartographic data read by the cartographic data reader, node connection information indicating a connecting relation viewed from the links to the nodes as the other-side connection information.

7. A computer program embodied on a computer readable medium for processing cartographic data including node data representing intersections on roads as nodes and link data representing the roads as links, the program comprising:
a step of storing the cartographic data; and
a step of processing the cartographic data stored in the storing step,
a step of the cartographic data stored in the storing step only having one-side connection information described therein, the one-side connection information indicating a connecting relation viewed in a direction from one of the nodes and the links to another one, and
the cartographic data processing step comprising:
a step of reading a required portion of the cartographic data stored in the storing step;
a step of complementing the read cartographic data by generating another-side connection information based on the one-side connection information described in the cartographic data read by the reading step, the other-side connection information indicating a connecting relation viewed in a direction reverse to the direction taken in the one-side connection information; and
a step of carrying out an arithmetic operation on the cartographic data complemented with the other-side connection information.

8. The program according to claim 7, wherein
the cartographic data stored in the storing step includes node connection information indicating a connecting relation viewed from the links to the nodes as the one-side connection information, and
in the complementing step, the read cartographic data is complemented with link connection information indicating a connecting relation viewed from the nodes to the links as the other-side connection information, the link connection information generated based on the node connection information included in the cartographic data read in the reading step.

9. The program according to claim 8, wherein
the cartographic data stored in the storing step includes link connection information indicating a connecting relation viewed from the nodes to the links as the one-side connection information, and
in the complementing step, the read cartographic data is complemented with node connection information indicating a connecting relation viewed from the links to the nodes as the other-side connection information, the node connection information generated based on the link connection information included in the cartographic data read in the reading step.

10. A computer program embodied on a computer readable medium for processing cartographic data including node data representing intersections on roads as nodes and link data representing the roads as links, the cartographic data being provided by a center station via a transmission path, the program comprising:
a step of receiving the cartographic data from the center station via the transmission path;
a step of storing the cartographic data received in the receiving step; and
a step of processing the cartographic data stored in the storing step, the cartographic data stored in the storing step only having one-side connection information described therein, the one-side connection information indicating a connecting relation viewed in a direction from one of the nodes and the links to another one, and the cartographic data processing step comprising:
a step of reading a required portion of the cartographic data stored in the storing step;
a step of complementing the read cartographic data by generating another-side connection information based on the one-side connection information described in the cartographic data read by the reading step, the other-side connection information indicating a connecting relation viewed in a direction reverse to the direction taken in the one-side connection information; and
a step of carrying out an arithmetic operation on the cartographic data complemented with the other-side connection information.

11. The program according to claim 10, wherein
the cartographic data transmitted from the center station includes node connection information indicating a connecting relation viewed from the links to the nodes as the one-side connection information, and
in the complementing step, the read cartographic data is complemented with link connection information indicating a connecting relation viewed from the nodes to the links as the other-side connection information, the link connection information generated based on the node connection information included in the cartographic data read in the reading step.

12. The program according to claim 10, wherein
the cartographic data transmitted from the center station includes link connection information indicating a connecting relation viewed from the nodes to the links as the one-side connection information, and
in the complementing step, the read cartographic data is complemented with node connection information indicating a connecting relation viewed from the links to the nodes as the other-side connection information, the node information generated based on the link connection information included in the cartographic data read in the reading step.

13. An information processing method for processing cartographic data including node data representing intersections on roads as nodes and link data representing the roads as links, the method comprising:
a step of storing the cartographic data; and
a step of processing the cartographic data stored in the storing step,
the cartographic data stored in the storing step only having one-side connection information described therein, the one-side connection information indicating a connecting relation viewed in a direction from one of the nodes and the links to another one, and
the cartographic data processing step comprising:
a step of reading a required portion of the cartographic data stored in the storing step;
a step of complementing the read cartographic data by generating another-side connection information based on the one-side connection information described in the cartographic data read by the reading step, the other-side connection information indicating a connecting relation viewed in a direction reverse to the direction taken in the one-side connection information; and
a step of carrying out an arithmetic operation on the cartographic data complemented with the other-side connection information.

14. The information processing method according to claim 13, wherein
the cartographic data stored in the storing step includes node connection information indicating a connecting relation viewed from the links to the nodes as the one-side connection information, and
in the complementing step, the read cartographic data is complemented with link connection information indicating a connecting relation viewed from the nodes to the links as the other-side connection information, the link connection information generated based on the node connection information included in the cartographic data read in the reading step.

15. The information processing method according to claim 13, wherein
the cartographic data stored in the storing step includes link connection information indicating a connecting relation viewed from the nodes to the links as the one-side connection information, and
in the complementing step, the read cartographic data is complemented with node connection information indicating a connecting relation viewed from the links to the nodes as the other-side connection information, the node connection information generated based on the link connection information included in the cartographic data read in the reading step.

16. A cartographic information providing method for providing an information terminal with cartographic data including node data representing intersections on roads as nodes and link data representing the roads as links, the cartographic data being provided by a center station via a transmission path,
the method comprising, at the center station,
a first storing step of storing the cartographic data; and
a step of reading a portion of the cartographic data requested by the information terminal from the cartographic data stored in the first storing step, and transmitting the read cartographic data to the information terminal via the transmission path; and
at the information terminal device,
a step of receiving the cartographic data transmitted from the center station via the transmission path;
a second storing step of storing the cartographic data received in the receiving step; and
a step for processing the cartographic data stored in the second storing step,
the cartographic data transmitted from the center station only having one-side connection information described therein, the one-side connection information indicating a connecting relation viewed in a direction from one of the nodes and the links to another one, and
the cartographic data processing step comprising:
a step of reading a required portion of the cartographic data stored in the second storing step;
a step of complementing the read cartographic data by generating another-side connection information based on the one-side connection information described in the cartographic data read by the reading step, the other-side connection information indicating a connecting relation viewed in a direction reverse to the direction taken in the one-side connection information; and a step of carrying out an arithmetic operation on the cartographic data complemented with the other-side connection information.

17. The cartographic information providing method according to claim 16, wherein the cartographic data transmitted from the center station includes node connection information indicating a connecting relation viewed from the links to the nodes as the one-side connection information, and in the complementing step, the read cartographic data is complemented with link connection information indicating a connecting relation viewed from the nodes to the links as the other-side connection information, the link connection information generated based on the node connection information included in the cartographic data read in the reading step.

18. The cartographic information providing method according to claim 16, wherein the cartographic data transmitted from the center station includes link connection information indicating a connecting relation viewed from the nodes to the links as the one-side connection information, and in the complementing step, the read cartographic data is complemented with node connection information indicating a connecting relation viewed from the links to the nodes as the other-side connection information, the node information generated based on the link connection information included in the cartographic data read in the reading step.

* * * * *